United States Patent

[11] 3,542,455

[72] Inventor Peter L. Jensen
 Livonia, Michigan
[21] Appl. No. 712,481
[22] Filed March 12, 1968
[45] Patented Nov. 24, 1970
[73] Assignee Ford Motor Company
 Dearborn, Michigan
 a corporation of Delaware

[54] DAY-NIGHT OUTSIDE REARVIEW MIRROR ASSEMBLY
 10 Claims, 5 Drawing Figs.

[52] U.S. Cl. .................................................. 350/280,
 350/283, 350/315
[51] Int. Cl. ............................................. G02b 17/00
[50] Field of Search .................................. 350/276—
 283, 299, 307, 268, 277, 290, 311 Inquired; 74/501M

[56] References Cited
 UNITED STATES PATENTS
 1,728,123 9/1929 Hummel ........................ 350/283
 2,003,248 5/1935 Chilowsky .................... 350/268X
 2,432,674 12/1947 Office ............................ 350/277X
 2,824,396 2/1958 Thomas ......................... 350/315X
 1,313,083 8/1919 Geist ............................. 350/277
 1,060,787 5/1913 Peterson ........................ 350/284
 2,139,707 12/1938 VanDenburg ................ 350/268
 2,416,764 4/1947 Madson ......................... 350/318
 2,989,896 6/1961 Bertell .......................... 350/277
 3,107,578 10/1963 Enelage ........................ 350/315
 FOREIGN PATENTS
 680,686 10/1952 Great Britain ................ 350/283
 1,059,898 3/1954 France .......................... 350/277
 1,096,174 6/1955 France .......................... 350/283

*Primary Examiner*—Paul R. Gilliam
*Attorney*—John R. Faulkner and E. Dennis O'Connor

ABSTRACT: A day-night rearview mirror assembly adapted to be positioned exteriorly of the passenger compartment of a motor vehicle. A transparent glass panel is positioned in a housing between a mirror and the area to be viewed. The mirror is surrounded by a movable, opaque shade having a window formed therethrough that may be brought into and out of registery with the reflective surface of the mirror. In the night viewing position, the window is out of registery with this reflective surface and an opaque shade material overlies the latter, thus preventing the reflection of environmental light sources such as commercial or street lights by the mirror as well as dimming the glare from the headlights of following vehicles.

Patented Nov. 24, 1970
3,542,455
Sheet 1 of 2
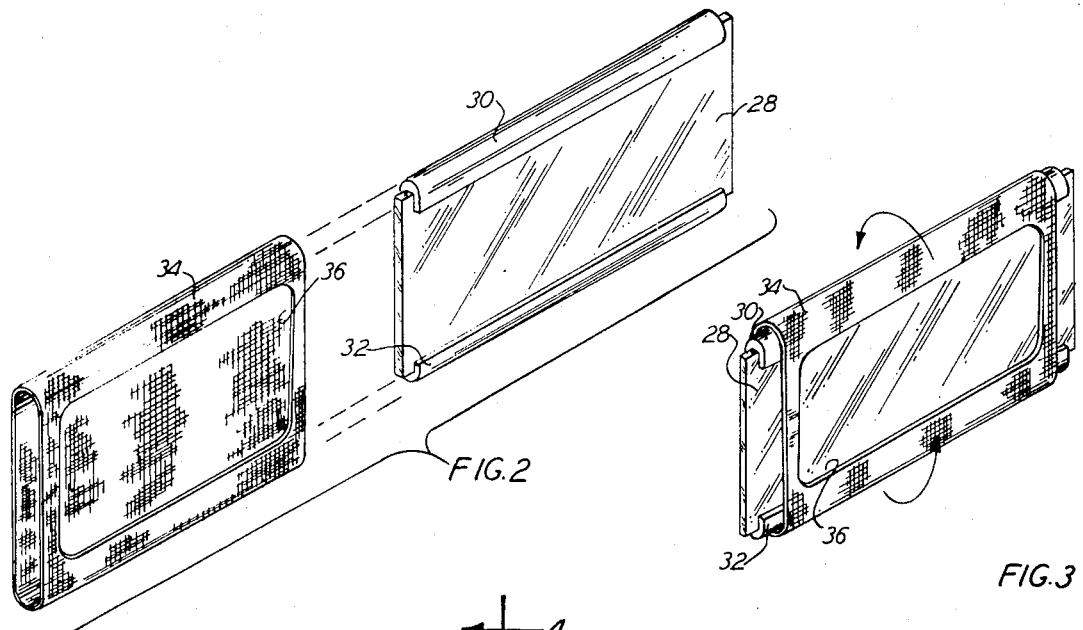
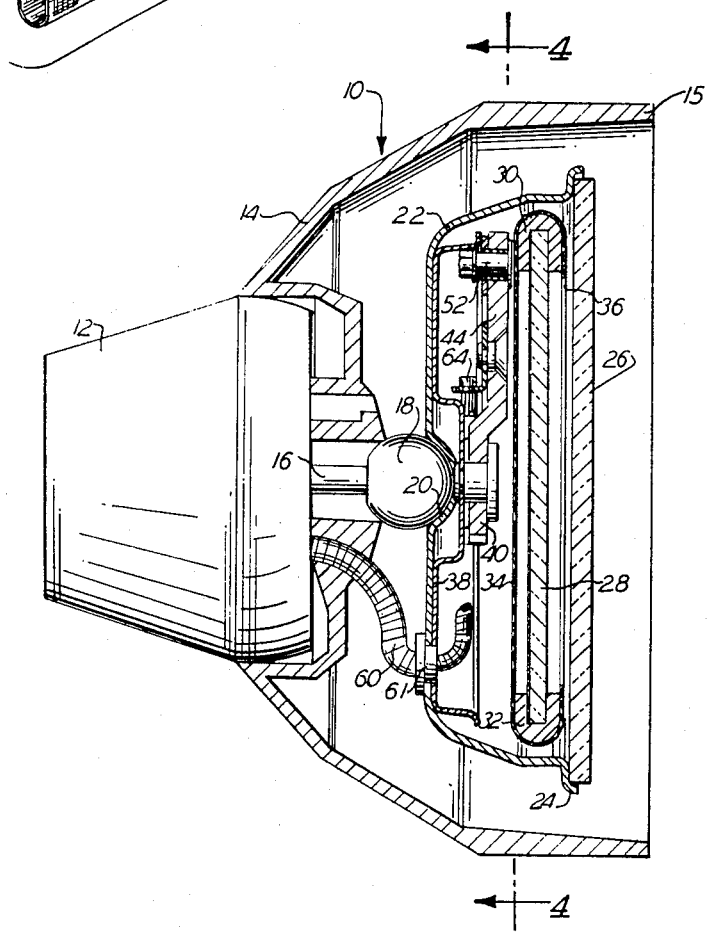
FIG. 1
PETER L. JENSEN
INVENTOR.
BY John K. Faulkner
E. Dennis O'Connor
ATTORNEYS Patented Nov. 24, 1970

3,542,455

PETER L. JENSEN
INVENTOR.

BY John R. Faulkner
E. Dennis O'Connor
ATTORNEYS

DAY-NIGHT OUTSIDE REARVIEW MIRROR ASSEMBLY

BACKGROUND OF THE INVENTION

Day-night rearview mirror assemblies are well-known in the motor vehicle art. Such mirror assemblies provide rear viewing by a motor vehicle occupant by means of a highly reflective surface during periods of daylight and are adjustable for night viewing by means of a surface having relatively low reflectivity. Such a feature minimizes the glare perceived by the eyes of the vehicle occupant due to the headlights of following vehicles; a glare that not only may be bothersome, but also may create an unsafe driving condition.

Conventionally, such mirror assemblies utilize a movable triangular prism, one surface of which has been treated to form a mirror. Rearview images seen by the vehicle occupant when the mirror assembly is in a daylight viewing position are reflected by this mirror. Adjusting the mirror to a night viewing position causes the prism to be tilted such that rearview images are reflected by the plain glass side of the prism which has a relatively low reflectivity of about 4 percent.

These conventional mirror assemblies function satisfactorily when mounted within the confines of a vehicle passenger compartment since, for night viewing, the prism may be oriented such that light passing through the backlight of the vehicle is reflected to the eyes of an occupant by a plain glass prism surface and is reflected by the mirror prism surface away from the eyes of the occupant. Light sources other than those to the rear of the vehicle in the main are prevented from being reflected by any portion of the prism due to the opaque body structure defining passenger compartment.

It has been found, however, that mirror assemblies including a movable prism as described above function unsatisfactorily during night use when mounted outside of the vehicle passenger compartment—as on the outer skin of a door assembly. Although light from sources positioned to the rear of the vehicle and reflected by the prism mirror is directed away from the eyes of the vehicle occupant, it has been observed that overhead lights, such as street lights and commercial neon signs, may be reflected by the mirror prism surface into the eyes of a vehicle occupant. This is due to the fact that such light sources are not shielded from an exterior mirror assembly.

It is an object of this invention to provide a day-night rearview mirror assembly that will function satisfactorily during all driving conditions when mounted on the exterior of a vehicle body. A mirror is provided for daylight viewing but effectively is shielded from all light sources when the assembly is in the night driving position. At such times, light is reflected by a plain glass surface having relatively low reflectivity.

SUMMARY OF THE INVENTION

A day-night mirror assembly constructed in accordance with this invention is adapted to permit a motor vehicle occupant to view an area to the rear of the vehicle with said assembly being mounted exteriorly of the vehicle passenger compartment. The mirror assembly includes a housing and a mirror mounting in the housing with the reflective surface of the mirror facing the area to be viewed. A transparent glass panel is mounted in the housing between the mirror and the area to be viewed. A sleeve, constructed at least in part of opaque material, surrounds the mirror. A portion of the sleeve is cut away to form a window therethrough. The sleeve is movable about the mirror from a first position wherein the sleeve window registers with the reflective surface of the mirror to a second position wherein opaque sleeve material registers with the reflective mirror surface. Manually operable control means are operatively connected to the sleeve and are capable of moving the sleeve between the first and second positions.

DESCRIPTION OF THE DRAWINGS

FIG. 1 is a side elevation view, partially in section and taken along the line 1-1 of FIG. 4 of the day-night rearview mirror assembly of this invention;

FIG. 2 is an exploded isometric view of the mirror and shade included in the assembly of FIG. 1;

FIG. 3 is an isometric view showing the parts illustrated in FIG. 2 as assembled;

DETAILED DESCRIPTION OF THE INVENTION

Figure 4:
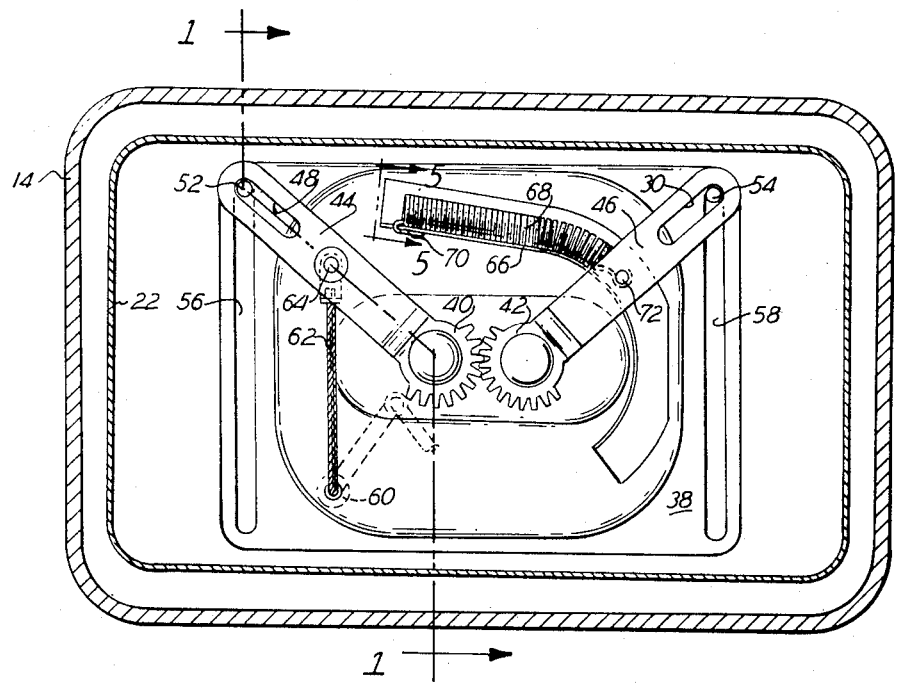
FIG. 4 is a sectional view taken along the line 4-4 of FIG. 1.
Figure 5:
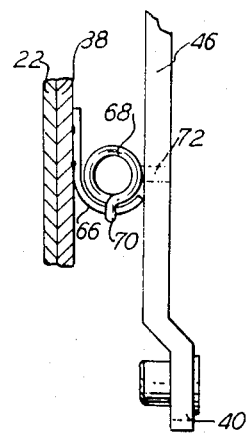
FIG. 5 is a partial sectional view taken along the line 5-5 of FIG. 4.

Referring now in detail to the drawings, and in particular to FIGS. 1, 2 and 3 thereof, the numeral 10 denotes generally the outside, day-night, rearview mirror assembly of this invention. This assembly includes a conventional intermediate mounting member 12, which is secured to an outer body panel of a motor vehicle by a stem (not shown) in the conventional manner. A decorative outer housing 14 is secured to member 12 and has an open end 15 facing the area to be viewed by the mirror assembly, that is, facing rearwardly of the vehicle associated with this assembly. A shaft 16 is secured to and protrudes from member 12 and extends into the cavity defined by outer housing 14. A ball 18 is formed integrally on the end of shaft 16 remote from member 12 and cooperates with a concave portion or socket 20 formed on an interior housing 22.

The ball and socket connection between ball 18 and socket 20 provide for pivotal movement of interior housing 22 within outer housing 14. Such movement may be accomplished by a remote control mechanism actuated from within the vehicle passenger compartment and connected to inner housing 22 by a plurality of flexible power transmitting cables as is well known in the art.

The open end of inner housing 22 has formed thereon a flange 24 that mounts and secures a transparent glass panel 26 to housing 22. Within inner housing 22 is positioned a mirror element 28 that is spaced from and substantially parallel to glass panel 26. The end portions of rectangular mirror 28 are secured to the sides of housing 22 as by a compression fit. Mirror 28 is positioned within housing 22 such that the reflective surface of mirror 28 faces the opened end of outer housing 15 and the area to be viewed to the rear of the vehicle.

As best may be seen from FIGS. 2 and 3, the long dimension edges of rectangular mirror 28 have secured thereto convex shade guides 30 and 32. A shade element 34 is positioned about mirror 28 in such a manner that it is movable about the mirror as illustrated by the arrows in FIG. 3. Element 34 is a continuous or endless element constructed of flexible, opaque material. Matte black fabric has been found satisfactory for the material comprising element 34. A portion of the material of shade element 34 is cut away to form a window 36 extending through this element.

It readily may be appreciated that movement of shade element 34 as indicated by the arrows in FIG. 3 will cause movement of window 36 from the position illustrated in FIGS. 1 and 3, wherein said window registers with the reflective surface of mirror 28, to a position wherein a portion of the opaque material of element 34 will overlie the reflective surface of mirror 28. The manner in which the movement is accomplished and the purpose for such movement will be explained in detail below.

A support member 38 is secured to housing 22 as illustrated in FIG. 1. As best seen in FIG. 4, a pair of sprockets 40 and 42 are pivotally secured to support member 38. Each of the sprockets 40 and 42 has teeth extending about approximately 180° of its circumference. The sprockets are positioned such that the teeth of the sprockets will mesh. A pair of lever arms 44 and 46 extend from sprockets 40 and 42 respectively, and move in unison with the pivotally mounted sprockets. The end of lever arm 44 remote from sprocket 40 has an elongated slot 48 formed therethrough. A similar slot 50 is formed through the end of lever arm 46 remote from sprocket 42.

A pin 52 extends through slot 48. One end of pin 52 protrudes into a slot 56 formed in support member 38. The end of pin 52 remote from slot 38 is bonded, as by an adhesive, to the material of shade element 34. A similar pin 54 extends through slot 50 with one of its ends riding in a slot 58 formed in support member 38 and the other of its ends bonded to the material of shade element 34.

A flexible power transmitting cable assembly 60, having one of its ends (not shown) located within the vehicle passenger compartment, passes through the intermediate mounting member 12 and extends through a grommet 61 located in registering apertures extending through inner housing 22 and support member 38. Within cable assembly 60 is a control wire 61 that is attached to lever arm 44 at point 64. It readily may be appreciated that a manual displacement of the end of wire 62 located within the vehicle passenger compartment will cause a corresponding movement of lever arm 44. Since lever arm 44 is mechanically connected to lever arm 46 through the cooperation of the teeth of sprockets 40 and 42, movement of lever arm 44 will be duplicated by movement of lever arm 46.

In FIGS. 1, 3 and 4, mirror assembly 10 is shown in the daylight driving position with shade element window 36 registering with the reflective surface of mirror 28. Upon the manual displacement of control wire 62 downward (as viewed in FIG. 4), the ends of lever arms 44 and 46 will also move downward as viewed in FIG. 4. This movement of the lever arms is guided due to the location of pins 52 and 54 in the slots formed in lever arms and the slots formed in support member 38. Since pins 52 and 54 are bonded to the material of shade element 34, the movement of these pins with the respective lever arms will cause a movement of shade element 34 such that window 36 no longer registers with the reflective surface of mirror 28. This reflective surface then is covered by a portion of the opaque material of shade element 34. At this time, mirror assembly 10 is in the night driving position.

A hook-shaped element 66 is secured to the surface of support member 38 proximate to shade element 34. One end 70 of a coil spring 68 is secured to element 66 with the other end 72 of spring 68 secured to lever arm 46. Upon a manual displacement downward of control wire 62 and a corresponding downward movement of lever arm 46, compression spring 68 will be placed in a state of tension such that it will exert a force biasing lever arms 44 and 46 into the daylight position illustrated in FIG. 4. The mirror control mechanism located within the vehicle passenger compartment includes a "hold" position maintaining the end of control wire 62 remote from assembly 10 in an orientation such that lever arms 44 and 46 are maintained against the force of spring 68 in a downward or night position. When it is desired to return shade element 34 to a daylight position wherein window 36 registers with a reflective surface of mirror 28, the passenger compartment control mechanism is manually motivated from this "hold" position and the force of spring 68 will return all parts to the orientations illustrated.

With the mirror assembly 10 in the daylight position illustrated in the drawings, images from the area to the rear of the vehicle will pass through transparent glass panel 26 and be reflected by the reflective surface of mirror 28 for viewing by a vehicle occupant. During vehicle operation during periods of darkness, shade element 34 is positioned such that the reflective surface of mirror 28 is covered by a portion of the opaque fabric of the shade element. Images from the rear of the vehicle, such as headlights of following vehicles, then are reflected by the plain glass panel 26 which has a reflectivity (about 4 percent) of a much lower value than the reflectivity of the mirror surface. The reflected image viewed by the vehicle occupant thus is of greatly diminished intensity and headlights of following vehicles and other light sources to not have a blinding effect on this occupant. Since mirror 28 is completely covered during vehicle operation in darkness by opaque material, environmental light sources such as commercial signs and overhead street lamps will not be reflected by the mirror into the eyes of the vehicle occupant.

In the event of a failure of the control mechanism, such as a parting of control wire 62, the force of spring 68 will return shade element 34 into the daylight driving position with window 36 registering with the reflective mirror surface 28. Thus, the presence of spring 68 is a "fail-safe" feature that prevents the mirror assembly of this invention from being struck or jammed in the night driving position due to a failure of the control mechanism.

It thus may be seen that this invention provides a rearview mirror assembly that may be mounted exteriorly of the vehicle passenger compartment and adjusted from the daytime position, wherein images to the rear of the vehicle are reflected by a surface having a relatively high degree of reflectivity, to a nighttime driving position, wherein reflection is by a surface having a relatively low degree of reflectivity.

I claim:

1. A day-night rearview mirror assembly for a motor vehicle, said mirror assembly comprising: a housing, a pair of reflector members secured within said housing in a spaced apart orientation, one of said members having a reflective surface of relatively high reflectivity, the other of said members having a reflective surface of relatively low reflectivity, a movable opaque shade element operatively secured within said housing in proximity to said one member and having a first position wherein said shade element registers with the reflective surface of said one member and a second position wherein said shade element is out of registry with the reflective surface of said one member, and manually operable control means operatively secured to said shade element and moving said shade element from one of said positions to the other of said positions.

2. The mirror assembly of claim 1 wherein said members comprise panes of glass arranged substantially parallel to one another, the reflective surface of said one member comprising a mirror, said other member being transparent.

3. The mirror assembly of claim 2, wherein the reflective surface of said one member is proximate said other member, said other member being located between said one member and the area to be viewed.

4. The mirror assembly of claim 3, including an endless shade member extending about said one reflector member said shade member being constructed of flexible opaque material and having a first portion thereof cut away to form a window therethrough, said shade element comprising a second portion of said shade member.

5. The mirror assembly of claim 4, wherein said shade member is movable about said one reflector member in response to the operation of said control means.

6. A day-night mirror assembly permitting a motor vehicle occupant to view an area to the rear of the vehicle, said mirror assembly including: a housing, a mirror mounted in said housing and having its reflective surface facing the area to be viewed, a transparent glass panel mounted in said housing between said mirror and the area to be viewed, and a sleeve constructed at least in part of opaque material surrounding said mirror, a portion of said sleeve being cut away to form a window therethrough, said sleeve being movable about said mirror from a first position wherein said window registers with said reflective surface to a second position wherein opaque sleeve material registers with said reflective surface.

7. The mirror assembly of claim 6, said assembly further including manually operable control means operatively connected to said sleeve and capable of moving said sleeve between said first and second positions.

8. The mirror assembly of claim 6, wherein said mirror and glass panel are oriented in substantially parallel, spaced-apart relationship.

9. The mirror assembly of claim 6, wherein said opaque material comprises matte black fabric.

10. The mirror assembly of claim 9, wherein said sleeve is a continuous length of said fabric.